United States Patent [19]

Nishimiya et al.

[11] Patent Number: 4,895,126
[45] Date of Patent: Jan. 23, 1990

[54] FLOW RATE CONTROL SYSTEM

[75] Inventors: Torazo Nishimiya, Mito; Tomoo Ito; Katsuzi Murao, both of Katsuta; Tohoru Ozawa; Yoshiro Kabakura, both of Hitachi, all of Japan

[73] Assignee: Hitachi, Ltd., Tokyo, Japan

[21] Appl. No.: 307,537

[22] Filed: Feb. 8, 1989

Related U.S. Application Data

[63] Continuation of Ser. No. 512,001, Jul. 8, 1983, abandoned.

[30] Foreign Application Priority Data

Jul. 9, 1982 [JP] Japan ................................ 57-118356

[51] Int. Cl.⁴ ...................... F02M 23/06; F02M 23/10
[52] U.S. Cl. .................................... 123/585; 123/588; 251/282
[58] Field of Search ..................... 123/585, 588, 339; 137/625.34, 505.18; 251/282

[56] References Cited

U.S. PATENT DOCUMENTS

| | | | |
|---|---|---|---|
| 3,053,271 | 9/1962 | Crittenden | 137/625.34 |
| 4,425,886 | 1/1984 | Kuroiwa et al. | 123/339 |
| 4,617,889 | 10/1986 | Nishimiya et al. | 123/339 |

FOREIGN PATENT DOCUMENTS

| | | | |
|---|---|---|---|
| 0148246 | 9/1983 | Japan | 123/588 |
| 0023543 | 1/1987 | Japan | 123/339 |

Primary Examiner—Willis R. Wolfe
Assistant Examiner—M. Macy
Attorney, Agent, or Firm—Antonelli, Terry & Wands

[57] ABSTRACT

A flow rate control system for controlling the idling rpm of an engine of a vehicle to a predetermined level in accordance with the temperature of cooling water or outdoor air, so as to eliminate hunting occurring in the flow rate of air supplied to the engine at engine startup the system includes a first valve seat, adapted to come into and out of engagement with a first valve body of a flow rate control valve assembly, and an annular protrusion located on a portion of an inner peripheral surface on an inlet side of the first valve seat. A conical surface portion is located downstream of the annular protrusion on an outlet side of the inner peripheral surface and divergingly tapers in a direction toward a downstream side of the first valve seat.

8 Claims, 3 Drawing Sheets

FLOW RATE CONTROL SYSTEM

This is a continuation of Ser. No. 512,001, filed July 8, 1983, now abandoned.

FIELD OF THE INVENTION

This invention relates to flow rate control systems mounted in throttle chambers of engines, and more particularly, to a flow rate control system suitable for use in controlling the idling rotational speed of an engine of a vehicle to a pressed level with respect to the temperature of water or outdoor air.

BACKGROUND OF THE INVENTION

Generally, control of the idling rotational speed of an engine of a vehicle to a predetermined level in accordance with the temperature of water or an electric load has been effected by providing bypass passageways to a throttle chamber for bypassing the throttle valve so as to regulate the volume of air flowing through the bypass passageways by utilizing the pressure differential between the inlet and the outlet of the throttle valve. However, some disadvantages are associated with this process of control. First of all, this process requires a large number of additional parts including an air regulator for use in starting the engine at low temperature, an automatic choking mechanism for use during warmup of the engine, a throw adjusting mechanism or a throttle adjusting mechanism for use after completion of engine warmup, an on-off solenoid valve for use when the cooler is turned on and a dashpot mechanism for use in deceleration of the engine. An increase in the number of parts might cause a reduction in the reliability of the system. To obviate this disadvantage, a flow rate control system has become popular which includes an electromagnetically operated valve mounted in the bypass passageways.

A flow rate control system of the last-mentioned type is shown in FIG. 1, wherein, according to this figure, an engine 10 has a suction pipe 12 and an exhaust pipe 14 connected thereto, with the suction pipe 12 mounting a fuel injection valve 15 and having a throttle chamber 16 located on its inlet end. The throttle chamber 16 mounts a throttle valve 18 in a central portion thereof and is provided with bypass passageways 20 and 22 which bypass the throttle valve 18 and constitute an inlet of an inflow passageway and an outlet of an outflow passageway, respectively, of a flow rate control system.

Located on the upstream side of the throttle chamber 16 is an air flow meter 24 which measures the volume of air flowing through an air cleaner 26 by converting the opening of a vane 28, which is varied in accordance with the air volume, to an electric output by means of a potentiometer 30.

The suction and exhaust pipes 12 and 14 are maintained in communication with each other through an exhaust gas recycling passageway 32, to enable a portion of exhaust gases to be returned to suction pipe 12 through an exhaust gas recycling valve 34 depending on engine operation condition. The engine 10 has mounted therein a crank angle sensor 35 for sensing the revolving velocity of the engine 10, and a water temperature sensor 36 for sensing the temperature of cooling water. A flow rate control system 38 is secured to the bypass passageways 20 and 22 of the throttle chamber 16.

The flow rate control system 38 comprises a flow rate adjusting section 40 and a solenoid section 42. The solenoid section 42 drives the flow rate adjusting section 40 to thereby effect control of the flow rate of a fluid (air). More specifically, the flow rate adjusting section 40 includes a body 44, an outlet passageway 46 formed in a central portion of the body 44, and an inlet passageway 48 located around the outlet passageway 46 substantially in the form of an inverted letter U and separated therefrom by a partition wall 52. The flow rate adjusting section 40 further comprises a rod 50 extending transversely through the outlet passageway 46 and inlet passageway 48 and having secured thereto a first valve body 58 and a second valve body 60 adapted to engage valve seats 54 and 56 respectively which are formed in the partition wall 52. The rod 50 is urged by the biasing force of a spring 62 through the second valve body 60 to move forwardly (leftwardly in FIG. 1), and penetrates at its forward end a core 64 of the solenoid section 42. The rod 50 has a plunger 66 secured to its forward end, and the core 64 and the plunger 66 are juxtaposed against each other at surfaces thereof which are conical in shape. A cylindrical coil 68 located around the core 64 and plunger 66 generates a magnetic force to cause them to be attracted to each other, so as to cause the rod 50 to shift rightwardly in FIG. 1 against the biasing force of the spring 62.

The coil 58 is controlled by, for example, an operation circuit 70 of a micro-computer, which processes an air volume signal produced by the potentiometer 30, an engine rpm signal produced by the crank angle sensor 34 and a cooling water temperature signal produced by the water temperature sensor 36 and supplies a predetermined output signal. The operation circuit 70 is also operative to control the fuel injection valve 15 to vary the amount of fuel injected in accordance with the amount of air flowing through the flow rate control system 38, to provide a predetermined engine rpm.

As described hereinabove, the flow rate control system 38 continuously effects control of air volume in accordance with the engine rpm, water temperature, etc., that have been sensed, to thereby automatically keep the engine rpm at a predetermined level. This system suffers the disadvantage that, as shown in solid line in FIG. 2 a hunting phenomenon might occur. This phenomenon would be marked when the diameter of the first valve body 58 is smaller than that of the second valve body 60. An investigation into the cause of the phenomenon has revealed that, since the flow rate control system 38 effects continuous control of air volume in place of the on-off control effected in the prior art, the hunting phenomenon occurs when the first valve body 58 and second valve body 60 are slightly released from contact with the valve seats 54 and 56, respectively, or when an input of small magnitude is fed into the flow rate control system 38 (at a point a in FIG. 2). When the valve bodies 58 and 60 are slightly released from contact with the respective valve seats 54 and 56, pressure differential of large magnitude would occur between the inlet and outlet of each of the valve seats 54 and 56, causing a sudden change to occur in the flow air and producing, at the same time, a pressure difference between the first valve body 58 and second valve body 60.

Proposals have been made to avoid this disadvantage by rendering the diameters of openings of the valve seats 54 and 56 equal to each other as shown in FIG. 3, to thereby equalize the crosssectional areas of channels for the fluid to flow in passing through the valve assembly 58, 54 and 60, 56. However, even with these proposals the following disadvantages would be inevitable.

If the diameters of the openings of the valve seats 54 and 56 are equal to each other then it would be impossible to assemble the flow rate control system in a condition in which the valve bodies 58 and 60 are secured to the rod 50, so that a reduction in reliability and a rise in cost might be caused by an increase in the number of parts and the number of process steps to be followed in fabrication.

Moreover, even if an attempt is made to equalize pressure differentials $F_1$ and $F_2$ between the valve bodies 58 and 60 when a static condition prevails on the side of the inlet passageway 48 and the side of the passageway 46 by equalizing the diameters of openings of the valve seats 54 and 56, it would be impossible to equalize the pressure differentials $F_1$ and $F_2$ because channels b and c of two directions, indicated by arrows in FIG. 3, would have flow coefficients distinct from each other due to a difference in the length of the channels and other factors.

Furthermore, even if it were possible to equalize the pressure differentials $F_1$ and $F_2$, it would be impossible to obtain a uniform flow condition when the valve bodies 58 and 60 are released from contact with the respective valve seats 54 and 56, inevitably resulting in the pressure differentials $F_1$ and $F_2$ becoming unbalanced.

SUMMARY OF THE INVENTION

This invention has been developed for the purpose of avoiding the aforesaid disadvantages of the prior art. Accordingly, an object of the invention resides in providing a flow rate control system capable of eliminating the occurrence of hunting phenomenon in the flow rate of a fluid.

The invention is based on the discoveries made as the results of experiments that pressure differential between inlet and outlet sides of one of a pair of valve seats located along a passageway of a fluid is distinct from the corresponding pressure differential of the other valve seat, and that a whirling flow of the fluid produced when valve bodies, adapted to come into and out of engagement with the valve seats, are released slightly from engagement with the respective valve seats, thereby causing hunting to occur in the flow rate of the fluid. The outstanding characteristic of the invention is that one valve seat, located on the upstream side of another valve seat forming a pair therewith, is formed on its inner peripheral surface with an anular protrusion located on the inlet side of the valve seat, and a conical surface portion located on the downstream side of the annular protrusion or on the outlet side of the valve seat, to cause a swirling flow of fluid to be produced on the upstream side of the valve seat and discharged to the outflow passageway to eliminate the occurrence of hunting in the flow rate of fluid.

FIG. 1 a partially schematic cross sectional view of a system for controlling a flow rate of air of an engine in which the present invention may be incorporated;

DETAILED DESCRIPTION

Figure 4:
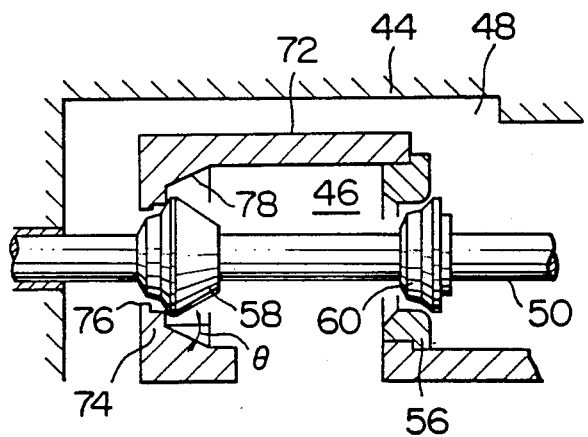
FIG. 4 is a cross sectional view of a valve seat construction of a flow rate control system constructed in accordance with the present invention.

Referring now to FIG. 4, wherein like reference numerals designate like parts, a valve seat section of the flow rate control system according to the invention includes the first valve body 58 located below a partition wall 72 separating the inlet passageway 48 from the outlet passageway 46, with the first valve body 58 being adapted to come into and out of contact with a valve seat 74 formed with an annular protrusion 76 located on a fluid inlet side of its opening to provide a stepped construction. When the pressure on the outflow passageway 46 side becomes lower than that on the inflow passageway 48 side, the fluid leaks from the inflow passageway 48 side to the outflow passageway 46 side through channels between the first valve body 58 and valve seat 74 and between the second valve body 60 and valve seat 56, respectively. This produces a swirling flow of fluid on the downstream side of the annular protrusion 76 or on the outlet side of the valve seat 74 of the first valve body 58, resulting in a reduction in the pressure of fluid.

The valve seat 74 is formed with a conical surface portion located on the outlet side thereof or on the side of the outflow passageway 46. The conical surface portion 78 is smooth and divergingly tapers in going from the inlet side of the valve seat 74 toward the outlet side thereof.

Figure 1:
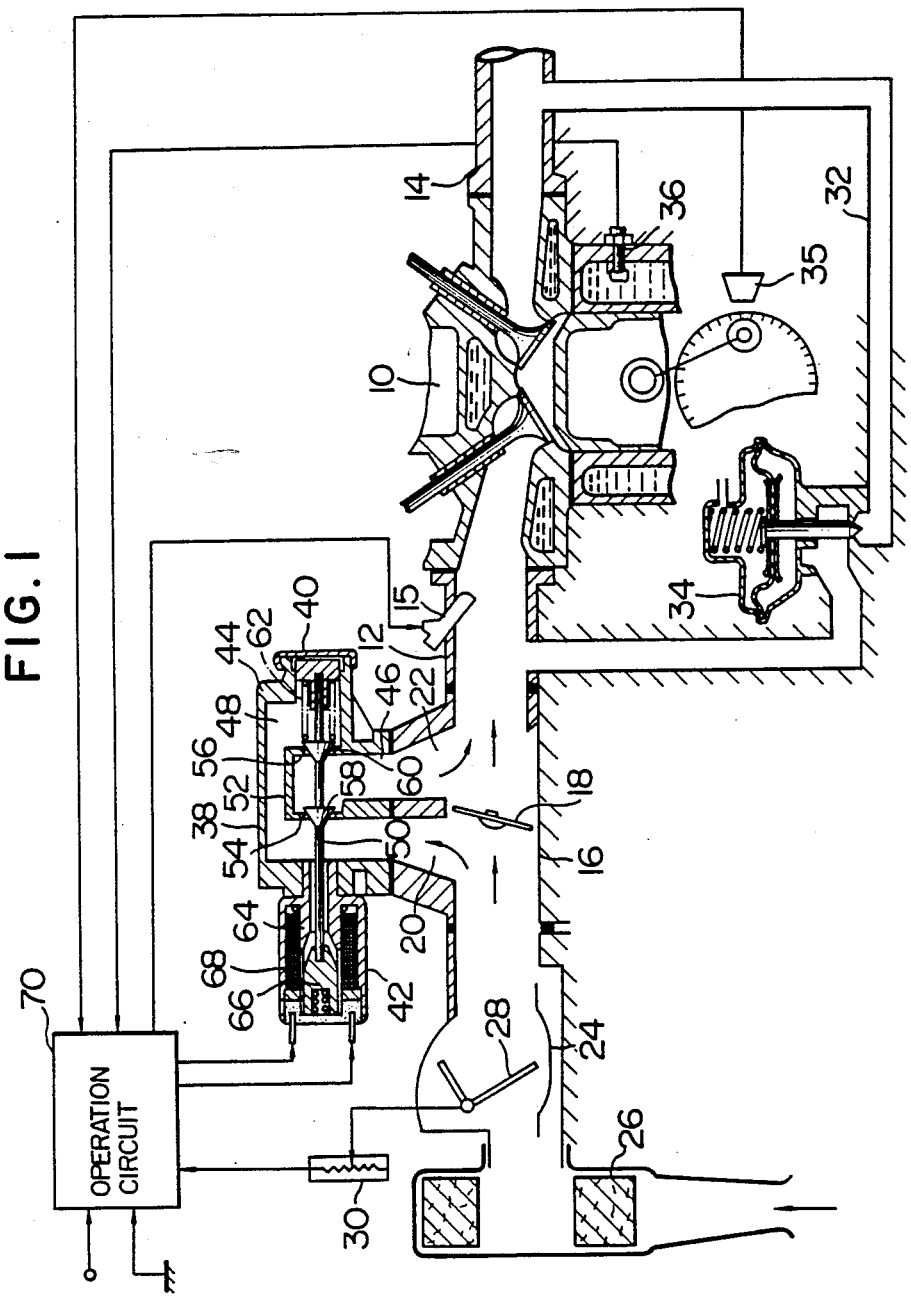
Figure 2:
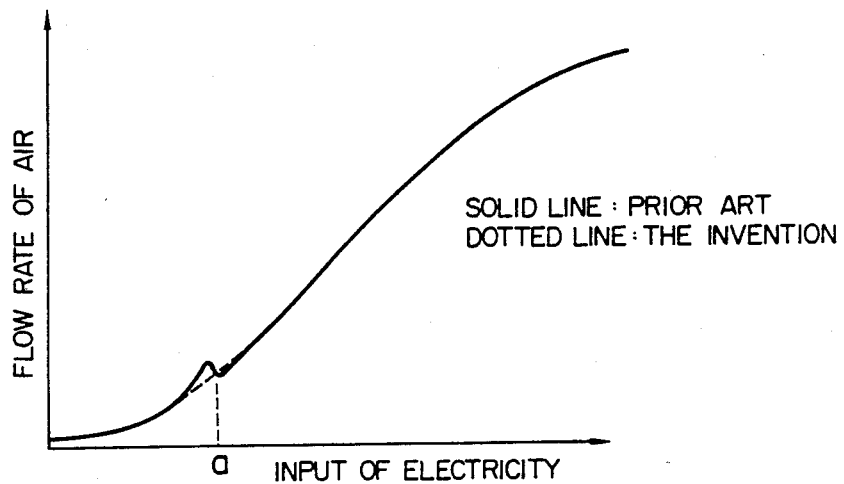
FIG. 2 is a graphical illustration of a relationship between an input of electricity to a flow rate control system and a flow rate of air.
Figure 3:
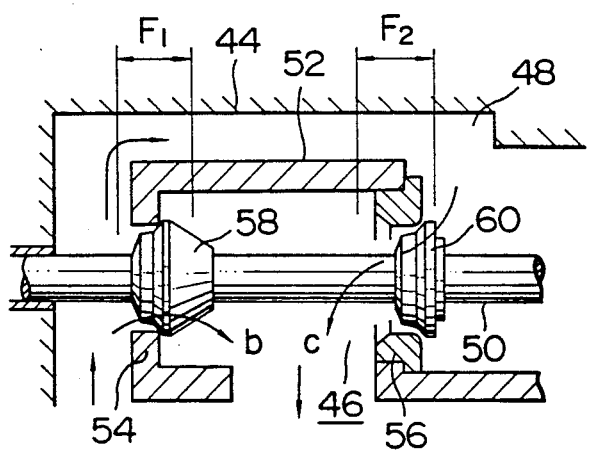
FIG. 3 is a partial cross sectional view of a valve seat of a flow rate control system constructed in accordance with the prior art.

Operation of the embodiment of the flow rate control system constructed as aforesaid is as follows. Assume that an output signal of the operation circuit 70 is supplied to the coil 68 of the solenoid section 42 to energize the coil 68 to thereby move the plunger 66 slightly rightwardly in FIG. 1 against the biasing force of the spring 62. As a result, the plunger 66 moves the first valve body 58 and second valve body 60 rightwardly through the rod 50, and air flows through the bypass passageway 20 to the inflow passageway 48 due to a negative pressure on the downstream side (engine side) of the throttle valve 18. From the inflow passageway 48, the air flows between the first valve body 58 and valve seat 74 and between the second valve body 60 and valve seat 56 to the outflow passageway 46, to be led to the engine 10 through the bypass passageway 22. At this time, the air current flowing along the valve seat 74 has a swirling flow produced therein by the annular protrusion 76, so that no particular change is produced in the flow condition (swirling flow) of the air current as a whole even if the first valve body 58 is slightly released from engagement with the valve seat 74. Moreover, the provision of the smooth conical surface portion 78 on the outlet side of the valve seat 74 allows the swirling flow produced by the annular protrusion 76 to enter the outflow passageway 46 without interference or without being amplified or reduced in magnitude. Thus, the flow rate of the air shows a smooth change as indicated by a dotted line in FIG. 2 without the occurrence of hunting, unlike the air flow rate of the flow rate control system of the prior art in which a swirling flow is newly produced when the valve bodies are released, even slightly, from engagement with the respective valve seats. This allows idling rpm of the engine 10 to be controlled smoothly and with a high degree of precision, thereby improving the performance and quality of the vehicle. The annular protrusion 76 and the conical surface portion 78 according to the invention can be provided by machining the partition wall 72 which is integral with the body 44. This allows a reduction in reliability and a rise in cost, which might result from an increase in the number of parts, to be avoided.

The conical surface portion 78 which divergingly tapers preferably forms an angle $\theta$ with the horizontal which is in the range between 15° and 60°. Experimental testing shows that when the angle $\theta$ is 10°, it becomes necessary to increase the distance between the two valve bodies 58 and 60 because it is impossible to provide a sufficiently high air flow rate unless the magnitude of movement of the valve body 58 is increased. When the angle $\theta$ is 70° degrees, it is impossible to completely eliminate the phenomenon of hunting.

From the foregoing description, it will be appreciated that the invention provides an annular protrusion on a portion of an inner peripheral surface on the inlet side of one valve seat on the upstream side of another valve seat with which it forms a pair, and a conical surface portion located on the outlet side of the inner peripheral surface, the conical surface forming an angle of 15° to 60° degrees with the horizontal. The invention can achieve the effect of eliminating the occurrence of hunting in the flow rate of air.

What is claimed is:

1. A flow rate control system comprising:
   a first valve body and a second valve body secured to a rod and spaced apart from each other longitudinally of the rod;
   an outflow passageway extending transversely between said first valve body and said second valve body;
   an inflow passageway located around said outflow passageway extending beyond the upstream side of said first valve body to said second valve body;
   a partition wall separating said outflow passageway from said inflow passageway, said partition wall being formed with a first valve seat adapted to have said first valve body come into and out of engagement therewith and formed with a second valve seat adapted to have said second valve body come into and out of engagement therewith;
   drive means for driving said rod to bring said first valve body and said second valve body into and out of engagement with said first valve seat and said second valve seat, respectively;
   means formed on the inner peripheral surface of the first valve seat for causing a swirling flow of fluid to be produced on the upstream side of the valve seat and discharged to the outflow passageway to eliminate the occurrence of hunting in the flow rate of fluid including an annular protrusion formed on the first valve seat along a portion of an inner peripheral surface of an inlet side of said valve seat and a surface portion located downstream of said annular protrusion on an outlet of the inner peripheral surface of the first valve seat and divergently tapering in a direction toward a downstream side of the first valve seat.

2. A flow rate control system as claimed in claim 1, wherein said divergently tapering surface portion located on the outlet side of the inner peripheral surface of the first valve seat comprises a conical surface portion extending smoothly toward the downstream side of the valve seat and forming with a horizontal, an angle $\theta$ which is in a range of between 15° and 60°.

3. A flow rate control system as claimed in claim 1, wherein said valve seat has a stepped configuration, with the surface portion located downstream of said annular protrusion being offset with respect to said annular protrusion.

4. A control arrangement for an engine, the engine comprising a suction pipe; an exhaust pipe; a throttle chamber means disposed at an inlet end of the suction pipe; a fuel injection valve means mounted in said suction pipe; a throttle valve means disposed in a portion of the throttle chamber means; a flow rate control means comprising a first flow body and a second flow body secured to a rod and spaced apart from each other longitudinally of the rod, bypass passage means including an outflow passageway extending transversely between said first valve body and said second valve body and an inflow passageway located around said outflow passageway extending beyond an upstream side of said first valve body and said second valve body with a partition wall separating said outflow passageway from said inflow passageway, said partition wall being formed with a first valve seat adapted to have said first valve body come into and out of engagement therewith and formed with a second valve seat adapted to have a second valve body come into and out of engagement therewith, said flow rate control system further comprising drive means for driving said rod to bring said first valve body and said second valve body into and out of engagement with said first valve seat and said second valve seat, respectively; means for causing a swirling flow of fluid to be produced on an upstream side of the valve and discharged to the outflow passageway to eliminate the occurrence of hunting in the flow rate of fluid including an annular protrusion formed on the valve seat along a portion of an inner peripheral surface of an inlet side of said first valve seat and a surface portion located on the inner peripheral surface of the first valve seat downstream of said annular protrusion on an outlet side of the inner peripheral surface of the first valve seat divergently tapering in a direction toward a downstream side of the first valve seat.

5. A control arrangement according to claim 4, wherein said divergently tapering surface portion located on the outlet side of the inner peripheral surface of the first valve seat comprises a conical surface portion extending smoothly toward the downstream side of the valve seat and forming with the horizontal, an angle $\theta$ which is in the range of between 15° and 60°.

6. A flow rate control system as claimed in claim 4, wherein said first valve seat has a stepped configuration with the surface portion located downstream of said annular protrusion being offset with respect to said annular protrusion.

7. A control arrangement according to claim 4, wherein said drive means includes a solenoid valve means responsive to output signals of an operation circuit means for controlling a position of the first and second valve bodies in accordance with operating conditions of the engine.

8. A control arrangement according to claim 4, wherein said operating conditions include at least one of coolant temperature and engine rotational speed.

* * * * *